United States Patent
Langholz et al.

(10) Patent No.: US 9,494,782 B2
(45) Date of Patent: Nov. 15, 2016

(54) DEVICE AND METHOD FOR MICROSCOPY USING LIGHT WITH DIFFERING PHYSICAL PROPERTIES

(71) Applicant: Carl Zeiss Microscopy GmbH, Jena (DE)

(72) Inventors: Nils Langholz, Apolda (DE); Viktor Drescher, Blankenhain (DE); Helmut Lippert, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/389,744

(22) PCT Filed: Apr. 5, 2013

(86) PCT No.: PCT/EP2013/001014
§ 371 (c)(1),
(2) Date: Sep. 30, 2014

(87) PCT Pub. No.: WO2013/149731
PCT Pub. Date: Oct. 10, 2013

(65) Prior Publication Data
US 2015/0077845 A1 Mar. 19, 2015

(30) Foreign Application Priority Data
Apr. 5, 2012 (DE) .......................... 10 2012 007 045

(51) Int. Cl.
*G02B 21/06* (2006.01)
*G02B 21/00* (2006.01)
(Continued)

(52) U.S. Cl.
CPC ........... *G02B 21/06* (2013.01); *G02B 21/0032* (2013.01); *G02B 21/0044* (2013.01);
(Continued)

(58) Field of Classification Search
CPC ... G02B 21/06; G02B 21/0044; G02B 21/365; G02B 21/0032; G02B 21/0092; G02B 21/36; G02B 26/0833
USPC .......................................... 359/386, 385, 388
See application file for complete search history.

(56) References Cited

U.S. PATENT DOCUMENTS 6,002,509 A 12/1999 Wijnaendts Van Resandt et al.
6,545,265 B1 4/2003 Czarnetzki et al.
(Continued)

FOREIGN PATENT DOCUMENTS

DE 19824460 A1 12/1999
DE 102005035553 A1 2/2007
(Continued)

OTHER PUBLICATIONS

Krzewina et al., Single-exposure optical sectioning by color structured illumination microscopy, Optics Letters, vol. 31, No. 4, Feb. 15, 2006, 3 pages.
(Continued)

*Primary Examiner* — Frank Font
(74) *Attorney, Agent, or Firm* — LaBatt, LLC

(57) ABSTRACT

The invention relates to a device for microscopy, with at least one light source for providing illumination light, with a detection unit for detecting light radiated back from a sample, with a microscopy optical unit for guiding illumination light onto the sample and for guiding light radiated back from the sample in the direction of the detection unit and with, arranged in an illumination beam path, an excitation mask (40) for providing structured illumination. The device is characterized in that the excitation mask is a spatially structured filter, which is transparent to light with a first physical property and which impresses spatial structure onto light with a second physical property that is different from the first physical property. The invention moreover relates to a method for microscopy.

24 Claims, 2 Drawing Sheets

(51) Int. Cl.
  *G02B 21/36* (2006.01)
  *G02B 26/08* (2006.01)
(52) U.S. Cl.
  CPC .......... *G02B21/0092* (2013.01); *G02B 21/36* (2013.01); *G02B 21/365* (2013.01); *G02B 26/0833* (2013.01)

(56) References Cited

U.S. PATENT DOCUMENTS

| | | | | |
|---|---|---|---|---|
| 2003/0076571 | A1* | 4/2003 | MacAulay | G02B 21/0028 359/237 |
| 2008/0218849 | A1* | 9/2008 | Uhl | G02B 21/0044 359/368 |
| 2009/0046298 | A1* | 2/2009 | Betzig | G01N 21/6445 356/521 |
| 2010/0108873 | A1 | 5/2010 | Schertner | |
| 2011/0284767 | A1 | 11/2011 | Wolleschensky et al. | |
| 2012/0133937 | A1* | 5/2012 | Heintzmann | G01J 3/02 356/364 |
| 2012/0250032 | A1* | 10/2012 | Wilde | G01B 9/02047 356/521 |
| 2013/0314717 | A1* | 11/2013 | Yi | G02B 21/0032 356/479 |
| 2014/0085426 | A1* | 3/2014 | Leone | G02B 26/0841 348/46 |
| 2015/0168702 | A1* | 6/2015 | Harris | G02B 21/08 850/30 |

FOREIGN PATENT DOCUMENTS

| | | |
|---|---|---|
| DE | 102007018048 A1 | 10/2008 |
| DE | 102008054317 A1 | 5/2010 |
| EP | 0882247 B1 | 4/2001 |
| WO | WO9731282 A1 | 8/1997 |
| WO | WO2004113988 A1 | 12/2004 |
| WO | WO2010128307 A1 | 11/2010 |

OTHER PUBLICATIONS

International Preliminary Report on Patentability for PCT/EP2013/001014 with English translation, Jul. 10, 2014, 15 pages.
International Search Report for PCT/EP2013/001014 with English translation, Jul. 19, 2013, 7 pages.

* cited by examiner

DEVICE AND METHOD FOR MICROSCOPY USING LIGHT WITH DIFFERING PHYSICAL PROPERTIES

The invention relates in a first aspect to a device for microscopy comprising: at least one light source to provide illuminating light, a detection unit to detect light radiated back from a specimen, a microscope optical system to guide illuminating light onto the specimen and to guide light radiated back from the specimen in the direction of the detection unit and an excitation mask arranged in an illumination optical path to provide a structured illumination.

According to a second aspect the invention relates to a method for microscopy wherein a specimen is illuminated with illuminating light, wherein light radiated back from the specimen is detected, wherein the illuminating light is spatially structured with an excitation mask, and wherein a spatially structured filter is used as an excitation mask.

A generic device for microscopy has the following components: at least one light source to provide illuminating light, a detection unit to detect light radiated back from a specimen, a microscope optical system to guide illuminating light onto the specimen and to guide light radiated back from the specimen in the direction of the detection unit, and an excitation mask arranged in an illumination optical path to provide a structured illumination.

According to a generic method for microscopy a specimen is illuminated with illuminating light, light radiated back from the specimen is detected and the illuminating light is spatially structured with an excitation mask.

A generic device and a generic method are described in EP 0 882 247 B1.

In the method of the so-called correlative aperture, besides the confocal information, the wide-field information is additionally microscopically obtained and used. The data sets obtained are taken into calculation with each other in order to obtain, overall, a higher information content from the specimen. For this purpose, a confocal image and a wide-field image are produced alternately. To this end, work takes place in most cases with different illuminations and a triggered data detection. For this, a rapid triggered switching between the illumination and the image recording is necessary. In most cases a grating structure is used to produce the confocality. The grating holes thereby function as pinholes. In order to avoid crosstalk between the individual pinholes, the holes must be surrounded by sufficiently wide bars or webs. Since the web material of the grating has a large surface area portion in these grating structures, this surface area must be subsequently blackened in order to prevent outshining the confocal information. The blackening leads to the grating absorbing the light, which can in turn potentially lead to overheating of the grating and hence poorer imaging properties. In addition, in spite of everything, a larger light portion is reflected. This stray light portion impairs the signal quality of the confocal image.

It can be regarded as an object of the invention to indicate a device and a method for microscopy, wherein the generation of the confocal information and the wide-field information is substantially simplified.

This object is achieved through the device having at least one light source to provide illuminating light, a detection unit to detect light radiated back from a specimen, a microscope optical system to guide illuminating light onto the specimen and to guide light radiated back from the specimen in the direction of the detection unit and an excitation mask arranged in an illumination optical path to provide a structured illumination, wherein the excitation mask is a spatially structured filter, which is transparent to light with a first physical property and which imprints a spatial structure on light with a second physical property differing from the first physical property. The object also is achieved through the method, wherein a specimen is illuminated with illuminating light, wherein light radiated back from the specimen is detected, wherein the illuminating light is spatially structured with an excitation mask, wherein a spatially structured filter is used as an excitation mask, and wherein the filter is transparent to light with a first physical property and the filter imprints a spatial structure on light with a second physical property differing from the first physical property.

Preferred variants of the method according to the invention and advantageous embodiments of the device according to the invention are the subject matter of the dependent claims and are furthermore described in the following description, in particular with the attached figures.

The device of the abovementioned type is further developed according to the invention in that the excitation mask is a spatially structured filter which is transparent to light with a first physical property and which imprints a spatial structure on light with a second physical property differing from the first physical property.

The method of the abovementioned type is further developed according to the invention in that the filter is transparent to light with a first physical property and that the filter imprints a spatial structure on light with a second physical property differing from the first physical property.

It can be regarded as a core idea of the invention, by way of departure from and going beyond the prior art, to use an excitation mask which imprints a spatial structure only on light with a certain property and on the other hand transmits light which does not have this property substantially unchanged and is in this sense transparent to this light.

An essential advantage of the invention is hereby achieved in that a microscopic image can be obtained in principle simultaneously both with the light which is spatially structured, thus having the second physical property, and also with the light having the first physical property.

Mechanical components can hereby be omitted in principle, which is always desirable in fine-mechanical equipment. In addition a considerable time advantage can be achieved, because the desired microscopic information can be obtained more quickly, namely in parallel or simultaneously.

Having regard to the excitation mask, it is essentially a matter for the present invention that it imprints a suitable spatial structure on the light with the second physical property. A spatial structure of the light with the second physical property is to be regarded as suitable when it, in general terms, facilitates increasing the resolution for the microscopic image.

In principle the excitation mask can for this purpose have one-dimensional or two-dimensional structures, for example pinholes or line-form or strip-form narrow diaphragms. These can be periodically arranged or also statistically distributed.

The principle according to the invention can then be realized in principle for transmission geometries just as for reflection geometries.

The excitation mask can for this purpose have chromatically adjustable liquid components, whereby this results in a considerable advantage that the whole device functions in principle without movable components.

This can also be realized for a reflection geometry if the excitation mask has a digital micromirror.

According to a particularly preferred variant of the device according to the invention, the first physical property is a first wavelength of the light and the second physical property is a second wavelength of the light differing from the first wavelength. In principle it is also possible for the first physical property to be a first wavelength range of the light and for the second physical property to be a second wavelength range of the light differing from the first wavelength range. The excitation mask is then a spatially structured color filter.

In principle, having regard to the first physical property of the light and the second physical property of the light, it is only a matter of these physical properties facilitating an adequate separation of the light both on the excitation side and also on the detection side.

In principle the light with the first physical property and the light with the second physical property can be provided from separate light sources. Variants are particularly preferable, however, wherein just one light source is provided which emits both light with the first physical property and also light with the second physical property.

The confocality is produced in this invention through finely structured color filters. As in the method of the so-called correlative aperture, besides the confocal information, the wide-field information is additionally obtained and used. In contrast with the method of the correlative aperture, according to the present invention the wide-field information and the confocal information are produced in particular at the same time. Depending upon the design of the whole system, triggering is not necessary. This results additionally in the possibility of doubling the recording speed with respect to the conventional principle. Depending upon the variant selected, the heat input through light absorption can also be reduced.

According to a further particularly preferred embodiment of the device according to the invention, the first physical property is a first polarization of the light and the second physical property is a second polarization of the light differing from the first polarization. For example it can be a linearly or circularly polarized light.

The spatial structure of the light with the second physical property, for example therefore light with a certain wavelength or a certain polarization, is usefully selected so that the resolution of the microscopic image recorded with this light is increased. The mechanisms which can hereby be effective are known in principle.

According to a particularly preferred variant of the method according to the invention the spatial structure imprinted on the light with the second physical property is selected so that the extraction of a confocal image is possible.

Since the confocal resolution essentially depends upon the wavelength, the variant can usefully thereby be selected, in which a discrimination is realized through different wavelengths and the first wavelength is greater than the second wavelength. The confocal image is thus preferably recorded with the shorter wavelength, with which the better resolution is possible.

In principle, however, the invention can also be realized if the confocal image is recorded with the greater wavelength and the wide-field image with the shorter wavelength.

In principle, the light with the first physical property and with the second physical property can be provided by one and the same light source so that in principle a single light source can be sufficient to realize the invention. The advantages of the invention are achieved in a particular way if light with the first physical property and light with the second physical property can be simultaneously radiated, because the wide-field image and the image recorded with structured illumination, which can in particular be a confocal image, can be recorded simultaneously.

In principle it is also possible to provide light with the first physical property and light with the second physical property from separate light sources. This is considered in particular if a discrimination is realized via the wavelength. It can be preferable according to this variant if at least one of the light sources is tunable. In particular it is useful to design the light source used to obtain the wide-field image to be tunable, because color information of the specimen can then also be obtained.

In principle it is also possible to use a broadband light source which emits both light with the first physical property and also light with the second physical property.

In principle the first physical property and the second physical property can also be larger wavelength ranges. According to a particularly simple and preferred variant of the method according to the invention, white light is used for example as light with the first physical property, whereby the light with the second physical property is filtered out of this light. This filtering-out of the light with the second physical property, thus the light which is subjected to the spatial structuring, is thereby realized particularly preferably with the excitation mask provided according to the invention.

If light with the first physical property and the second physical property is simultaneously radiated onto the excitation mask, and the wide-field image and the image with structured illumination are thus simultaneously obtained, suitable measures must be taken to separate the respective light portions before the detector.

It is thus useful for a beam splitter to be provided before the detection unit to separate light with the first physical property and the second physical property. Depending upon the property to be used to distinguish the light, it can thereby be a color beam splitter or polarization beam splitter. In principle any type of two-dimensional image detector or sensor array can be used as a detection unit.

In principle, two or more sensor arrays can also be provided for example which can be used to detect the different light portions of the light coming from the specimen. For example, the light with the first physical property can be detected with a first sensor array and the light with the second physical property can be detected with the second sensor array. Suitable means must once again be provided to separate the light portions. In principle, however, it is sufficient if a single sensor array is provided, with which both light with the first physical property and also light with the second physical property can be detected. If the light coming from the specimen simultaneously contains both light portions, suitable means to filter out the respectively desired light must be provided before the sensor array.

It is therefore particularly advantageous if a filter exchange means, in particular a filter wheel or a filter slider, with a plurality of different filters is provided before the detector unit and/or after at least one of the light sources. This filter, or optionally a plurality of filters, is/are usefully (a) color filter(s) or polarization filter(s).

As an alternative to the use of a plurality of sensor arrays, a single sensor array can also be sub-divided and a first region of the sensor array can be used to detect light with the first physical property and a second region of the sensor array to detect light with the second physical property.

If color information of the wide-field image is also desired for certain examinations, the detection unit can usefully also comprise a multi-channel sensor array, thus a sensor array, with which the detection of different colors is possible.

According to further preferred variants of the method according to the invention, the microscopic recordings are recorded continuously during a z-scan. This means that the distance of the specimen from the microscope optical system is changed continuously or in steps over time. Since the confocal microscope data thereby generated depend clearly more sensitively upon the z-position than the wide-field data, it is advantageous to read the confocal image information as far as possible with high frequency. If, for example, spectral information is additionally to be recorded for the wide-field recordings and different color filters are provided for this purpose before the detection unit, it is useful to arrange the different color filters, for example on a filter wheel, in such a way that the confocal information is read after every second image.

Polarization filters can usefully be provided to suppress stray light.

Further advantages and features of the present invention are described below by reference to the attached drawing, in which.

The same components and those having the same effect are generally identified in the figures by the same reference signs.

Figure 1:
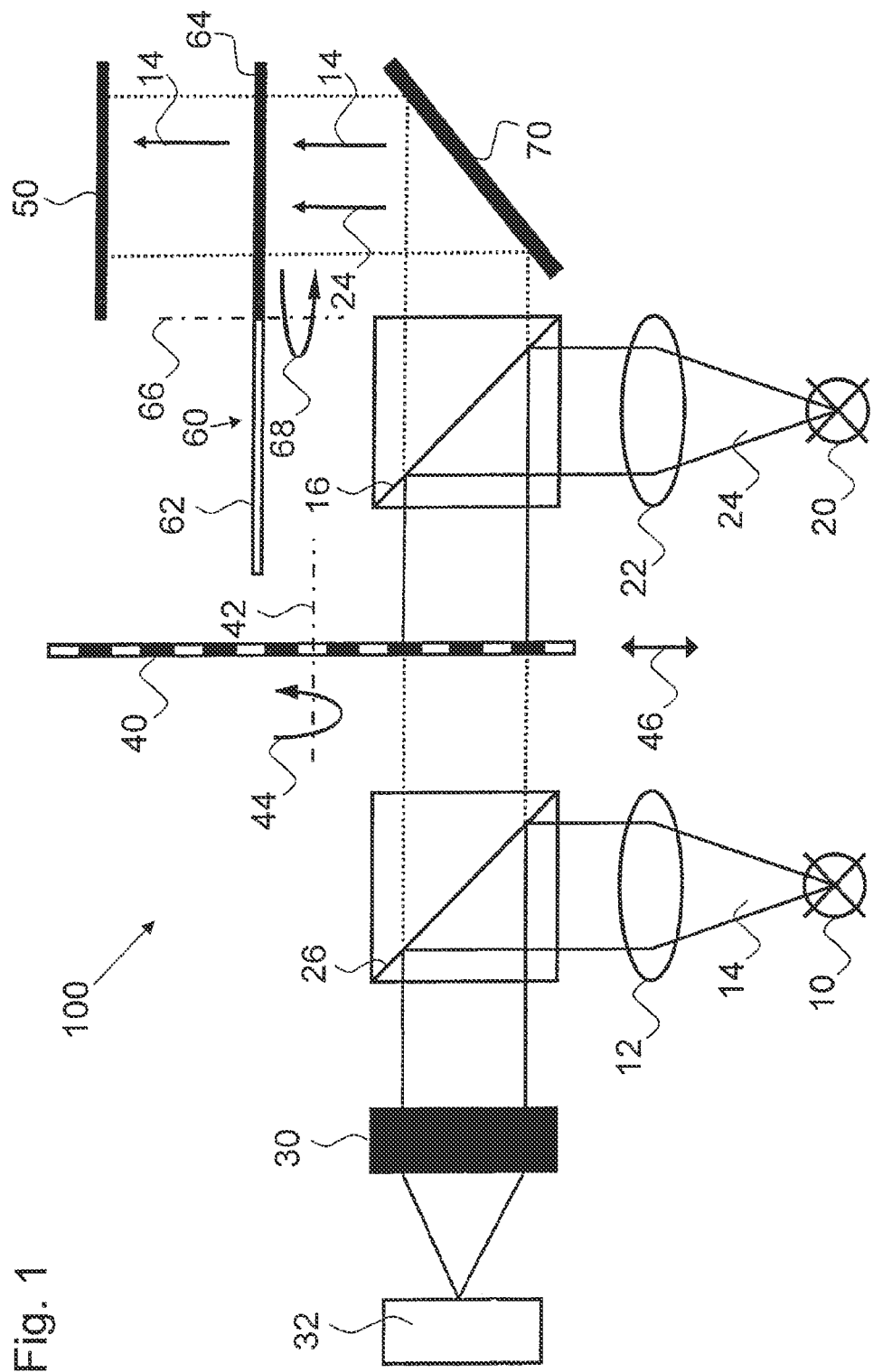
FIG. 1 shows a first embodiment of a device according to the invention.

FIG. 1 shows a first embodiment of a device according to the invention for microscopy which has the following essential components: a first light source 10, a second light source 20, a microscope optical system 30, an excitation mask 40 and a detection unit 50.

In the embodiment shown, the light 14 of the first light source 10 has a first wavelength as a first physical property and the light of the second light source 20 has a second wavelength differing from the first wavelength as a second physical property. The light 14 of the first light source 10 is in-coupled via optical means 12 and a beam splitter 26 into the excitation optical path and is guided via the microscope optical system 30 as illuminating light onto a specimen 32. A wide-field measurement is carried out with the aid of the light 14 of the first light source 10. Light 14 radiated back from the specimen 32 passes essentially unhindered through the excitation mask 40 and also through a beam splitter 16 and is deflected via a mirror 70 in the direction of the detection unit 50.

A filter wheel 60 with different color filters 62, 64 is arranged before the detection unit 50. In the example shown, the color filter 64 is to be transparent to light 14 of the first light source 10 so that, in the situation shown in FIG. 1, the light 14 of the first light source 10 passes unhindered through the color filter 64 and can be detected in the detection unit 50.

The light source 20 supplies light 24 with a second wavelength which is preferably shorter than the wavelength of the light of the first light source 10. The light 24 of the second light source 20 is in-coupled into the excitation optical path via optical means 22 and a beam splitter 16. Unlike the light 14 of the first light source 10, however, a spatial structure is then imprinted on the light 24 according to the essential aspect of the invention through the excitation mask 40. This spatial structure is suited for example to obtain a confocal image of the specimen 32. For this purpose, the excitation mask 40 is moved appropriately relative to the optical axis of the system. This can be realized on the one hand through rotation about an axis 42, as indicated by the arrow 44. In principle, however, a linear movement, indicated by a double arrow 46, is also possible.

The light 24, on which a spatial structure is imprinted through the excitation mask 40, passes via the beam splitter 26 and the microscope optical system 30 onto the specimen 32. Light 24 reflected back from there takes essentially the same path back via the microscope optical system, the beam splitter 26 and the excitation mask 40 and is then transmitted at least partially through the beam splitter 16 and is in turn deflected via the mirror 70 in the direction of the detection unit 50. If the color filter 62 of the filter wheel 60 is positioned in the beam splitter, the light 24 of the second light source passes through this color filter and can be detected in the detection unit. The detection unit 50 preferably consists of a CCD sensor array in the embodiment shown.

A rotation movement of the filter wheel is indicated in FIG. 1 by the arrow 68.

Figure 2:
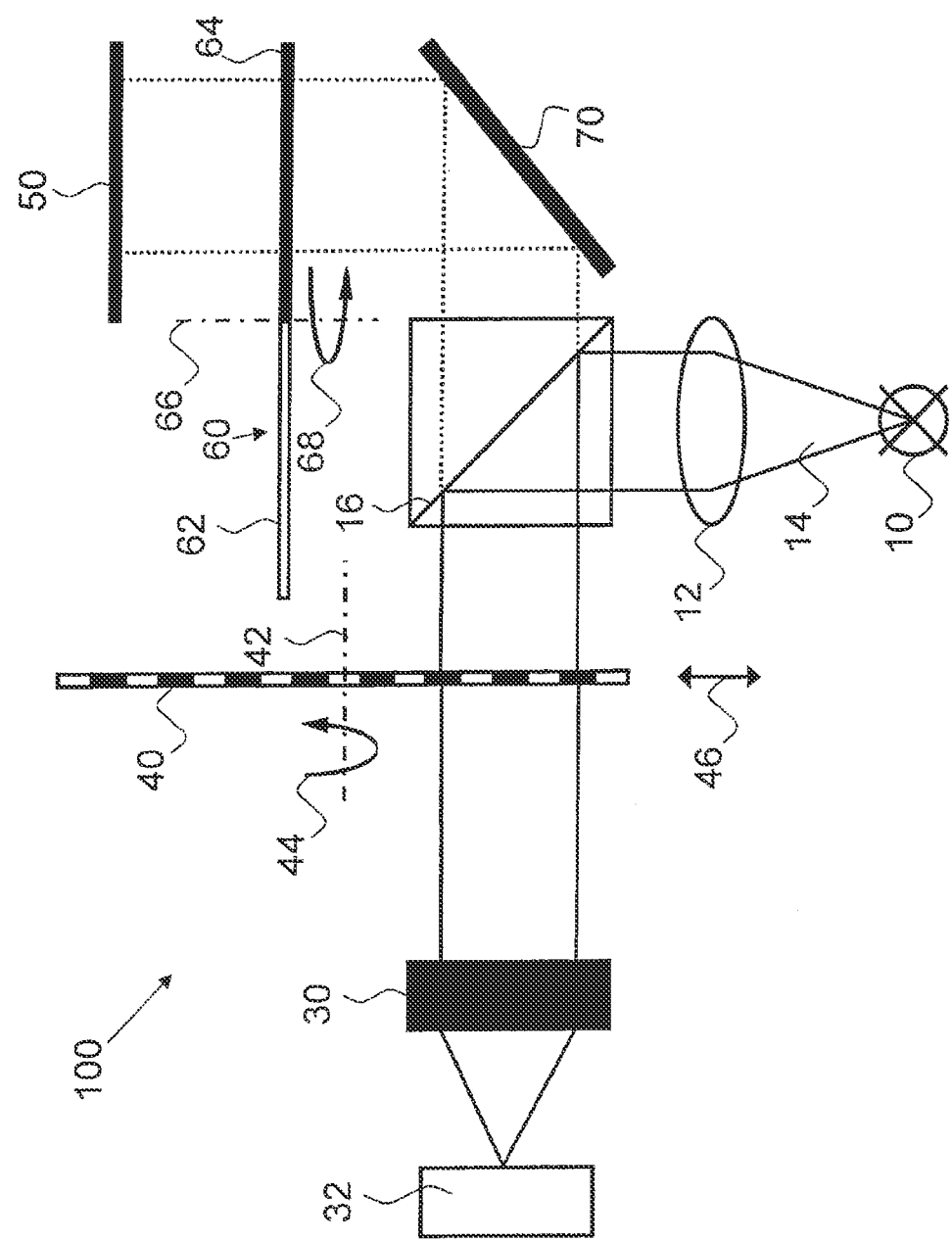
FIG. 2 shows a second embodiment of a device according to the invention.

A particularly simple embodiment of a device 100 according to the invention is shown in FIG. 2. In contrast with the variant shown in FIG. 1, this embodiment functions with only one light source 10. This light source 10 supplies light both with the first and also with the second wavelength, whereby in principle a broadband light source 10 can be used for this purpose. The remaining functioning corresponds to that described with reference to FIG. 1.

An essential feature of the invention is accordingly an excitation mask, which can also be described as a grating plate, on which the respective filters with a sufficiently small structural size are arranged. In particular these are color filters and accordingly a color filter disc with color gratings. In order that the microscopic information can be separated suitably and sufficiently well thereafter, these color filters must also have a sufficiently high suppression of the other respective light component. For example, if the wavelength is used for discrimination, the filters must have a sufficiently high color suppression.

Instead of a grating, finely structured color filters are used to produce the confocality. The triggered production and detection of confocal and wide-field information can thereby be omitted.

Depending upon the variant, the color information can additionally be read very simply.

Through limited additional constructive resources it is additionally possible to read the confocal information and the wide-field information at the same time. The recording speed can thereby in principle be doubled.

The shortwave light is guided onto the excitation mask 40 which is also described as a grating plate. It is advantageous to select the shorter wavelength for the confocal illumination, because the confocal resolution depends sensitively upon the wavelength and improves with shorter wavelengths. The grating plate consists of finely structured color filters, of which the lateral extension corresponds to the requirements of confocality. The color filters are alternately permeable and impermeable for the shorter wavelength. The permeable regions are shortpass filters which allow the corresponding spectral range to pass through. The impermeable regions are correspondingly longpasses which block this wavelength range.

The shortwave light impinges, after the grating plate, through the further imaging optical systems 30 onto the specimen 32 and is reflected from there back to the excitation mask 40 or grating plate. According to the confocal principle, only the part of the light, at which the surface of the specimen 32 is located precisely in the focal point, goes through the shortpass filters.

The longwave light passes via the imaging optical systems 30 directly onto the specimen, is reflected there and passes on its return path unhindered through the excitation mask 40 again.

The shortwave confocal light and the longwave wide-field light are guided from the excitation mask 40 to the detection unit 50 and detected there. In the example shown, the detection unit 50 contains a two-dimensional sensor array. In the basic variant, two color filters 62, 64 are located on a filter wheel 60 here. The filter wheel 60 can be rotated about an axis identified by the reference sign 66 and allows— depending upon the position of this filter wheel 60—the confocal portion or the wide-field portion of the light to pass through. This is facilitated through the core idea of the invention that the two pieces of microscopic information are present separately, namely through the first physical property and the second physical property which differs therefrom, in particular, as in the example shown here, being chromatically separated.

Through a synchronisation of triggered color filter and image recording it is possible to detect the wide-field information and the confocal information one after the other with a sensor array.

The lateral scanning over the specimen is realized by moving the grating plate, thus the excitation mask 40, perpendicularly to the optical axis, similarly to the case of a conventional spinning disc system with a Nipkow disc.

The grating plate and triggered color filter are designed in this example as rotating discs. It is, however, also possible to move the color filters linearly in one direction.

A structure completely without movable parts can be achieved with liquid crystal arrays.

It is also particularly advantageous if the light source used for the structured illumination, in particular thus to generate a microscopic image, has a wavelength which is as short as possible. In general it should not be shorter than the wide-field wavelength.

Furthermore, additional color filters are useful after the illumination bodies in order to facilitate cleanly separated color spectra of the individual excitation wavelengths.

In addition the following variants are possible:

Variant 1: Confocal excitation with shortwave monochromatic narrowband light. Depending upon the design of the optical system with respect to chromatic aberrations, the longer-wave light should likewise be narrowband and have only a slightly higher wavelength, or it can be significantly longer-wave and broader-band. The detection is realized with a single-channel sensor array, for example a CCD or CMOS camera.

A color filter can be located before the detector, said color filter allowing the shortwave portion or the longwave portion to pass through depending upon the position.

Variant 2: By way of a modification of Variant 1, the detection is realized via a color splitter which guides the light onto two sensor arrays. No triggering is advantageously necessary here.

Variant 3: Instead of two separate sensor arrays, one and the same sensor array is sub-divided into two different regions and the color splitter guides the light onto the first or the second part respectively. This cost-effective solution facilitates only a smaller field of view and thus a lower resolution.

In principle the wide-field illumination can be carried out with white light.

Further possible variants are obtained by combining the respectively proposed illuminations.

Variant 4: Instead of the color filter with two color regions in the detection optical path, further additional regions with bandpasses can be used in order to allow a chromatic division of the wide-field spectrum. In this case, not only two individual images must be produced for a complete image but instead one image for each color channel. The additional detection of the color information of the specimen is hereby advantageously facilitated.

The color filter can in principle also be structured so that the confocal information is read with every second individual image. The color information is thereby read over a plurality of z-sections. Since the wide-field information, in comparison with the confocal information, is more insensitive to changes in the focal point, this is possible without quality reductions and the microscopic information can be provided very effectively according to this variant.

Alternatively or additionally, a color filter with a plurality of different color fields can also be positioned before the sensor array for the wide-field detection. The complete color detection is then realized for each z-section individually. A higher recording speed can additionally be achieved if a multi-channel sensor array is used as the sensor array, in particular a three-channel sensor array with the colors yellow, red and blue. An advantage of cost-effective detection of the colors without loss of speed is achieved here. However, the resolution is reduced because only a fraction of the light sensors are sensitive in the shortwave confocal range.

This can be avoided in principle if a separate camera is used for the confocal microscopic information.

Instead of the wide-field illumination, in particular a tunable light source or a graduated color filter arranged after the light source, which corresponds in principle to the previously mentioned filter exchange means, can also be used to determine the color information.

Instead of two light sources, a broadband light source can then also be used. This is a particularly simple variant of the present invention. This broadband light source is used instead of the shortwave light source to produce the confocal image. The wide-field illumination is then likewise realized with this light source, and the second light source can then be omitted. White LEDs with a peak in the spectrum in the blue or violet range and a broad longwave spectrum can be used for example for this purpose. According to this variant, attention is usefully to be paid to a good separation of the color information in the detection optical path.

Instead of excitation masks which are essentially structured color filters and which are moved over the optical path, in particular in the region of an intermediate image, to generate the microscopic information with structured illumination, transmitted light LCDs, thus liquid crystal components, can also be used. These components can also be obtained in principle with chromatic adjustability. An essential advantage of these variants is to be seen in that a system can be constructed completely without movable parts. These liquid crystal components can also be activated in particular in such a way that the structuring, consisting of one-dimensional and/or two-dimensional elements, is statistically distributed.

The principle according to the invention can also be realized with the aid of polarized light and pole filters. This is possible in particular with rapidly switchable liquid crystal components. Polarized light additionally offers the possibility of suppressing scattered light with the aid of further pole filters. It is thereby to be considered that a microstructure of the specimen to be examined can also influence the polarization of the light.

In addition it is possible in principle to apply the principle described here also in reflection instead of in transmission. This applies in particular to the variant with a DLP (digital light processing) projection system. A very accurate and quick production and a rapid exchange of the excitation mask can be achieved with these components.

LIST OF REFERENCE SIGNS

10 First light source
12 First optical means
14 Light of the first light source
20 Second light source
22 Second optical means
24 Light of the second light source
30 Microscope optical system
32 Specimen
40 Excitation mask
42 Rotation axis of the excitation mask
44 Rotation arrow
46 Double arrow
50 Detection unit
60 Filter wheel
62 First color filter
64 Second color filter
66 Optical axis
68 Rotation arrow
70 Mirror
100 Device

The invention claimed is:

1. A device for microscopy, comprising:
at least one light source to provide illuminating light, the illuminating light including light with a first physical property and light with a second physical property different from the first physical property, wherein the first physical property is a first wavelength or a first wavelength range of the light and the second physical property is a second wavelength of the light differing from the first wavelength or a second wavelength range of the light differing from the first wavelength range,
a detection unit to detect light radiated back from a specimen,
a microscope optical system to guide illuminating light onto the specimen and to guide light radiated back from the specimen in the direction of the detection unit and
an excitation mask arranged in an illumination optical path to provide a structured illumination, wherein
the excitation mask is a spatially structured filter,
which is transparent to light with the first physical property, and
which imprints a spatial structure on light with the second physical property, and wherein illuminating light with the first physical property is transmitted substantially unchanged by the excitation mask.

2. The device as defined in claim 1, wherein the excitation mask has one-dimensional or two-dimensional structures.

3. The device as defined in claim 1 or 2, wherein the excitation mask has chromatically adjustable liquid crystal components.

4. The device as defined in claim 1, wherein the excitation mask is a reflection filter or a transmission filter.

5. The device as defined in claim 1, wherein the excitation mask has a digital micromirror.

6. The device as defined in claim 1, wherein just one light source is provided which emits both the light with the first physical property and also light with the second physical property.

7. The device as defined in claim 1, wherein the first wavelength is greater than the second wavelength.

8. The device as defined in claim 1, wherein at least one of the light sources is tunable.

9. The device as defined in claim 1, wherein at least one of the light sources is broadband.

10. The device as defined in claim 1, further comprising a filter exchange means having a plurality of different filters at at least one of the following positions: before the detection unit or after at least one of the light sources.

11. The device as defined in claim 10, wherein the filters are color filters.

12. The device as defined in claim 10, wherein the filters are polarization filters.

13. The device as defined in claim 11, wherein the different color filters are arranged on the filter exchange means such that confocal information can be read after every second image.

14. The device as defined in claim 1, wherein a beam splitter is provided before the detection unit to separate light with the first physical property and light with the second physical property.

15. The device as defined in claim 14, wherein the beam splitter is a color beam splitter or a polarization beam splitter.

16. The device as defined in claim 1, wherein the detection unit has at least one sensor array.

17. The device as defined in claim 1, wherein the detection unit has at least one multi-channel sensor array.

18. A method for microscopy,
wherein a specimen is illuminated with illuminating light, the illuminating light including light with a first physical property and light with a second physical property different from the first physical property,
wherein light radiated back from the specimen is detected,
wherein the illuminating light is spatially structured with an excitation mask,
wherein a spatially structured filter is used as an excitation mask, and
wherein the filter is transparent to light with the first physical property and the filter imprints a spatial structure on light with the second physical property, wherein the spatial structure imprinted on the light with the second physical property allows a confocal image to be obtained, and wherein illuminating light with the first physical property is transmitted substantially unchanged by the excitation mask.

19. The method as defined in claim 18, wherein a widefield image is recorded with the light with the first physical property.

20. The method as defined in claim 18, wherein scanning is carried out in a direction perpendicular to the specimen.

21. The method as defined in claim 18, wherein a first region of a sensor array is used to detect light with the first physical property and a second region of the sensor array is used to detect light with the second physical property.

22. A device for microscopy, comprising:
at least one light source to provide illuminating light, the illuminating light including light with a first physical property and light with a second physical property different from the first physical property, wherein the first physical property is a first polarization of the light and the second physical property is a second polarization of the light differing from the first polarization, a detection unit to detect light radiated back from a specimen, a microscope optical system to guide illuminating light onto the specimen and to guide light radiated back from the specimen in the direction of the detection unit and an excitation mask arranged in an illumination optical path to provide a structured illumination, wherein the excitation mask is a spatially structured filter, which is transparent to light with the first physical property, and which imprints a spatial structure on light with the second physical property, and wherein illuminating light with the first physical property is transmitted substantially unchanged by the excitation mask.

23. The device as defined in claim 22, wherein the excitation mask has at least one of: chromatically adjustable liquid crystal components or a digital micromirror.

24. The device as defined in claim 22, wherein at least one of the light sources is at least one of: tunable or broadband.

\* \* \* \* \*